G. P. HOLDEN.
FOLDING DRAG EVENER.
APPLICATION FILED OCT. 1, 1917.
1,261,533.
Patented Apr. 2, 1918.
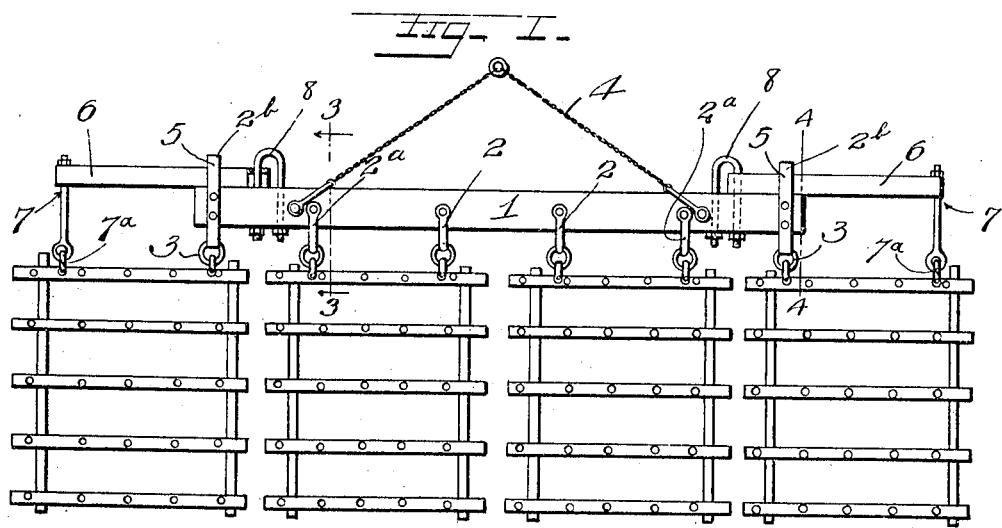
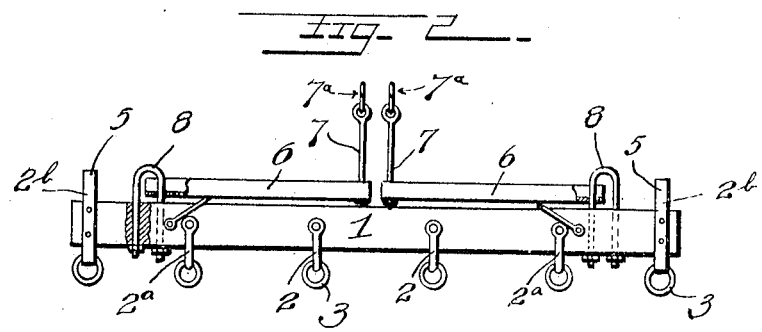
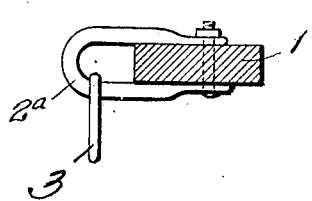 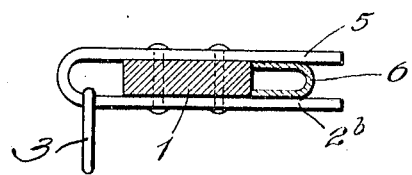
Witness
Robt. Hoge
Inventor
G. P. Holden
By H. B. Willson & Co.
Attorneys

UNITED STATES PATENT OFFICE.

GENTON P. HOLDEN, OF PETERSBURG, MINNESOTA.

FOLDING DRAG-EVENER.

1,261,533.  Specification of Letters Patent.  Patented Apr. 2, 1918.

Application filed October 1, 1917. Serial No. 194,235.

*To all whom it may concern:*

Be it known that I, GENTON P. HOLDEN, a citizen of the United States, residing at Petersburg, in the county of Jackson and State of Minnesota, have invented certain new and useful Improvements in Folding Drag-Eveners, and do declare the following to be a full, clear, and exact description of the invention, such as will enable others skilled in the art to which it appertains to make and use the same.

My invention relates to improvements in drag or harrow eveners and more particularly to one which is intended to fold to permit passage thereof through an ordinary farm gate.

One object of the invention is to so construct the device as to cause the forward pull on the main tree to retain the two folding auxiliary trees in operative position.

A further object is to provide novel means for preventing vertical shifting of the auxiliary trees, yet to permit forward folding thereof when necessary.

With the foregoing general objects in view, the invention resides in the novel features of construction and unique combinations of parts to be hereinafter fully described and claimed, the descriptive matter being supplemented by the accompanying drawings which form a part of this specification and in which:—

Figure 1 is a top plan view of the improved evener applied to a sectional drag or harrow;

Fig. 2 is a top plan view of the evener folded, parts being shown in horizontal section; and Figs. 3 and 4 are vertical transverse sections on the planes of the lines 3—3 and 4—4 respectively of Fig. 1.

In the drawings above briefly described, the numeral 1 designates the main tree of the evener, the rear edge of said tree being equipped with a plurality of U-shaped clips 2, $2^a$, and $2^b$, all of said clips serving to connect rings 3 with the tree 1 for the purpose of attaching said tree to the several sections of the drag or other implement with which it is employed.

The clips 2 and $2^a$ are of usual U-shaped construction the clips $2^a$ being shown in Fig. 3. A draft chain 4 is attached to draft tree 1 adjacent clips $2^a$ by means of which a team may be hitched to the device. The clips $2^b$ are also constructed in a peculiar manner, the upper and lower arms 5 of said clips being extended forwardly beyond the front edge of the tree 1 so that they may receive therebetween a pair of auxiliary trees 6 which are preferably though not necessarily formed of channel metal whereas the tree 1 will in most cases be constructed of wood.

The rear edges of the auxiliary trees 6 contact with the front edge of the tree 1 and said auxiliary trees project beyond the ends of the main tree as shown, the outer ends of said auxiliary trees being provided with any preferred means such as eye bolts 7 and split rings $7^a$ for detachably connecting them with the outer implement sections. The inner ends of the trees 6 are pivotally connected to the main tree to permit forward folding thereof. Such pivotal connections between the trees 1 and 6, may be effected in any preferred manner, but U-bolts 8 are by preference employed for this purpose, this construction being simple and inexpensive, yet highly efficient and durable.

By constructing the improved evener as shown and described, the forward pull on the chain or the like 4, will retain the auxiliary trees in proper contact with the front edge of the main tree, and the forwardly projecting arms 5 of the clips $2^b$ will prevent vertical shifting of said auxiliary trees. The device is thus practically a single rigid structure, when in use in the field, but when the drag or harrow is to be drawn through a gate, or between two posts or other vertical obstructions, the auxiliary trees 6 may be folded forwardly after disconnecting them from the outermost sections of the implement. When these sections are folded, it will be obvious that the drag or the like may be easily drawn between the obstructions, thus effecting a great saving in time and labor.

On account of the several advantages flowing from the specific details of construction above described, such details constitute the preferred form of the improved evener. I wish it understood, however, that within the scope of the invention as claimed, numerous minor changes may well be made.

I claim:

An evener comprising a main tree, a pair of auxiliary trees abutting against the front edge of said main tree and extending beyond the edge thereof, means pivotally connecting the inner ends of said auxiliary trees to said main tree for forward folding, U-shaped clips secured transversely to the ends of said main tree for connecting it to an implement, the ends of the clip arms extending forwardly from said main tree to receive said auxiliary trees therebetween, means for connecting said auxiliary trees to the implement, and means for hitching a team to said main tree.

In testimony whereof I have hereunto set my hand in the presence of two subscribing witnesses.

GENTON P. HOLDEN.

Witnesses:
F. W. CRUMB,
M. S. MILLER.

Copies of this patent may be obtained for five cents each, by addressing the "Commissioner of Patents, Washington, D. C."